US007916487B2

(12) United States Patent
Bitton et al.

(10) Patent No.: US 7,916,487 B2
(45) Date of Patent: Mar. 29, 2011

(54) METHOD AND APPARATUS FOR THE ENHANCED DISASTER SURVIVABILITY OF A NETWORKED COMPUTER SERVER

(76) Inventors: Yosef Bitton, Rochester, MN (US); John H. Shaffer, Rochester, MN (US); Kenneth D. Aaker, Rochester, MN (US)

( * ) Notice: Subject to any disclaimer, the term of this patent is extended or adjusted under 35 U.S.C. 154(b) by 1143 days.

(21) Appl. No.: 11/544,415

(22) Filed: Oct. 10, 2006

(65) Prior Publication Data

US 2007/0061598 A1   Mar. 15, 2007

Related U.S. Application Data

(63) Continuation-in-part of application No. 10/907,371, filed on Mar. 30, 2005, now abandoned.

(51) Int. Cl.
*H05K 7/20* (2006.01)

(52) U.S. Cl. ............... 361/724; 361/679.02; 361/679.57; 713/194; 312/223.1; 312/223.2; 174/50

(58) Field of Classification Search .................. 312/409; 361/679.46, 679.57
See application file for complete search history.

(56) References Cited

U.S. PATENT DOCUMENTS

| 3,559,594 | A |   | 2/1971 | Miller |
|---|---|---|---|---|
| 4,048,926 | A |   | 9/1977 | Brush, Jr. et al. |
| 4,547,454 | A |   | 10/1985 | Hoffmann et al. |
| 4,685,303 | A |   | 8/1987 | Branc et al. |
| 4,685,402 | A | * | 8/1987 | Nelson et al. .................. 109/65 |
| 4,712,490 | A |   | 12/1987 | Lichter |
| 4,831,476 | A |   | 5/1989 | Pisczak |
| 4,980,786 | A |   | 12/1990 | O'Sullivan |
| 5,152,231 | A |   | 10/1992 | Preston |
| 5,160,357 | A | * | 11/1992 | Faber ........................... 55/385.2 |
| 5,295,447 | A |   | 3/1994 | Robbins |
| 5,377,514 | A |   | 1/1995 | Robbins |
| 5,457,603 | A |   | 10/1995 | Leeb |
| 5,479,341 | A | * | 12/1995 | Pihl et al. ......................... 700/79 |
| 5,555,156 | A | * | 9/1996 | Decante ................... 361/679.57 |
| 5,623,597 | A | * | 4/1997 | Kikinis ............................. 726/18 |
| 6,011,701 | A | * | 1/2000 | Kopp et al. ...................... 361/818 |
| 6,158,833 | A | * | 12/2000 | Engler ............................. 312/409 |
| 6,542,359 | B2 | * | 4/2003 | Babcock et al. .......... 361/679.46 |

(Continued)

*Primary Examiner* — Jayprakash N Gandhi
*Assistant Examiner* — Anthony Q Edwards
(74) *Attorney, Agent, or Firm* — James V. Harmon; Nikolai & Mersereau, P.A.

(57) ABSTRACT

An apparatus for protecting a digital electronic data processor or stored digital data from damage includes a digital data unit comprising a data storage medium, a protective housing having side, top, and bottom walls defining a closed compartment which contains the digital data unit to shield the digital data therein from environmental damage. Active and passive protection from overheating and data encryption provides further data protection. The housing has at least one access port for supplying electrical power or for information transfer to or from the data unit therein. The port is sealed to prevent the introduction of environmental substances into the housing in the event of potential damage from an environmental disaster or other cause. The invention thus makes possible the safe storage of digital information in a computer data storage system which therefore has substantially increased capacity to survive disasters such as fires, floods, earthquakes, and theft, as well as more common computer problems such as disk drive failures. The invention can employ multiple computer network data access mechanisms that store digital data, including but not limited to Microsoft Windows File Sharing, Common Internet File Systems (CIFS), Network File Systems (NFS), Novell Netware File Systems, iSCSI, Storage Area Network Protocol, and Network SQL Database Mechanism or other data processing units.

12 Claims, 13 Drawing Sheets

U.S. PATENT DOCUMENTS

| | | |
|---|---|---|
| 6,686,003 B2 | 2/2004 | Legare |
| 6,901,557 B1 * | 5/2005 | Martinez et al. ............... 715/772 |
| 6,983,378 B1 * | 1/2006 | Kokubo ........................... 726/26 |
| 7,211,742 B2 * | 5/2007 | Moore et al. ................... 174/539 |
| 7,245,491 B2 * | 7/2007 | Throckmorton et al. ..... 361/695 |
| 7,291,784 B2 * | 11/2007 | Moore et al. ..................... 174/50 |
| 7,399,719 B2 * | 7/2008 | Hanan et al. ................... 442/136 |
| 7,443,660 B2 * | 10/2008 | Mayuzumi ............... 361/679.55 |
| 7,545,639 B2 * | 6/2009 | Ridge ........................... 361/690 |
| 7,573,713 B2 * | 8/2009 | Hoffman et al. ............... 361/697 |
| 7,609,512 B2 * | 10/2009 | Richardson et al. ..... 361/679.41 |
| 2004/0012316 A1 * | 1/2004 | Davis ............................ 312/409 |
| 2005/0195075 A1 * | 9/2005 | McGraw et al. ............... 340/500 |
| 2005/0286225 A1 * | 12/2005 | Moore et al. ................... 361/695 |
| 2006/0075509 A1 * | 4/2006 | Kishon ............................ 726/34 |
| 2008/0113676 A1 * | 5/2008 | Hutton et al. .................. 455/461 |

* cited by examiner

METHOD AND APPARATUS FOR THE ENHANCED DISASTER SURVIVABILITY OF A NETWORKED COMPUTER SERVER

This application is a continuation-in-part of the prior application by Yosef Bitton, Ser. No. 10/907,371, filed Mar. 30, 2005 (now abandoned) which is incorporated herein by reference and all of the claims hereof are supported by and obtain the benefit of said prior application except claims 2, 5, 6, 11, 12, 18 and 19 which find support in the present application.

BACKGROUND OF THE INVENTION

Many individuals and enterprises that have begun accumulating significant amounts of digital information lack a reliable and convenient way to preserve this digital information in case of disaster, such as fire or flood. This digital data may include, but is not limited to, personal financial records, scanned copies of paper documents, digital photos, video, music, and other digital data. The current mechanisms for protecting this digital data are unreliable and sufficiently laborious that often this data is not protected in any way. Additionally, prior mechanisms for backing up and preserving this data often expose the backup copy to the possibility of theft or loss.

Modern day businesses are moving at an ever greater pace with real-time transactions taking place at a rate in which the loss of even a few minutes worth of data can cause significant problems in recovery. Thus an active, protected computer server that has permanent and immediate survivability in the face of disaster is an ever increasing need. For example, doing periodic backups, the temporal cost of these backups is increasing such that losing a week or just a day's worth of data can prove devastating.

The fundamental facility of U.S. Pat. No. 6,158,833, for example, is the dissipation of heat generated by the storage element through the use of a large enclosure. The patented system attempts to protect a specific backup storage element but it suffers from the aforementioned need to actively perform a data backup function which is required or data protection is non-existent. U.S. Pat. No. 5,623,597 has a system for protecting a data storage element. However, this active system leads to a complicated mechanism that is by nature prone to failure.

In view of these and other deficiencies of the prior art, the present invention has as one object the provision of an apparatus for storing digital data that has a significantly improved ability to survive common disasters such as fire, water damage, flood, and structural destruction. Another object is to provide additional, optional mechanisms to protect sensitive information stored in the apparatus, even if the apparatus is stolen.

A further object is to provide mechanisms used with data storage apparatus that are convenient enough to facilitate and even encourage the invention's use.

Yet another object is to provide a data protection apparatus which employs two fundamentally different mechanisms for heat dissipation including a way of reducing power consumption during periods of low or no use which fully engages only when service is required of a user, as well as a second fundamentally different mechanism of heat dissipation.

These and other more detailed and specific objects of the present invention will be better understood by reference to the following Figures and detailed description which illustrate by way of example but a few of the various forms of the invention within the scope of the appended claims.

THE FIGURES

Figure 1:
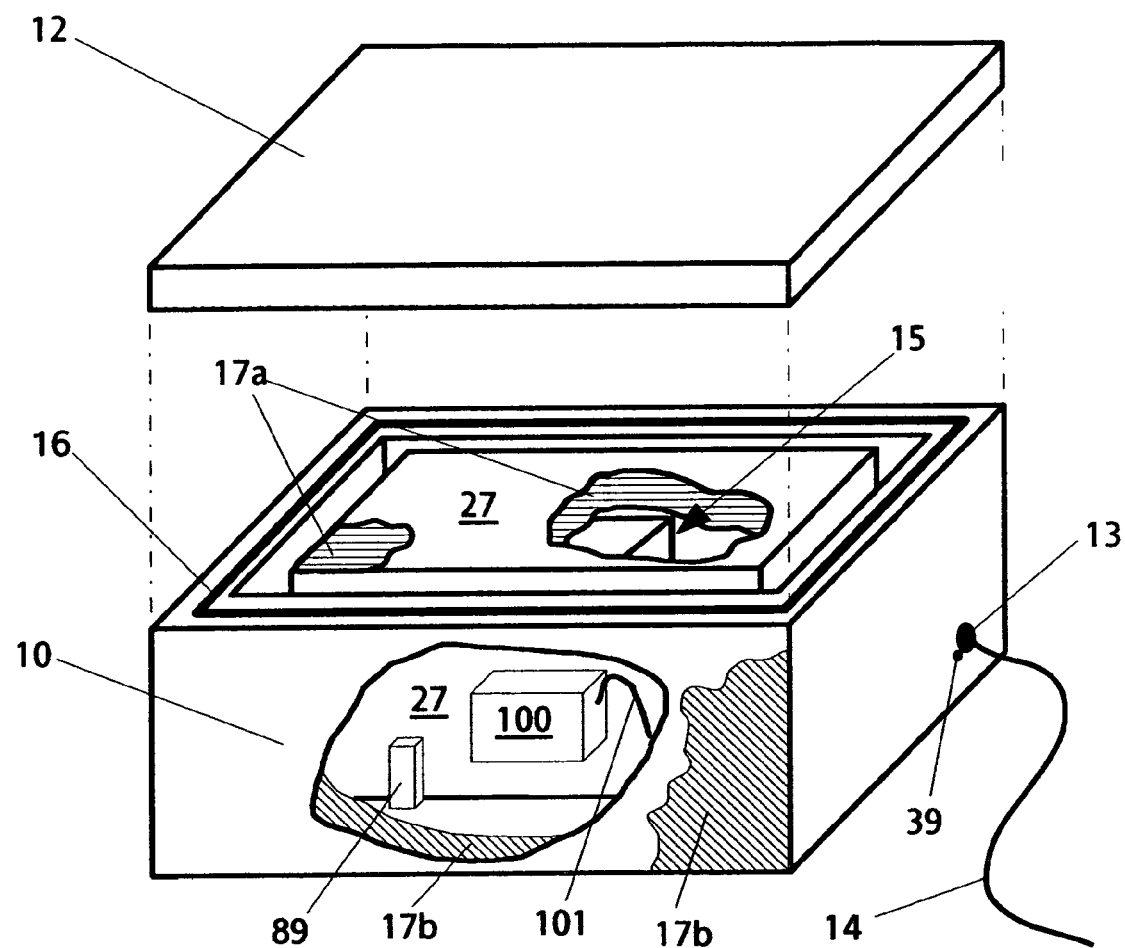
FIG. 1 is a diagrammatic perspective view of one preferred form of the invention partly broken away showing an external protective enclosure, an internal heat-absorbing envelope, a power and network connectivity cable and the internal enclosure containing the computer server.

Briefly, the invention includes an outer protective enclosure or container for a data processor, i.e. computer, that provides environmental protection from fire, water, and tampering or theft of the computer components. An external electrical connection assembly provides connectors that furnish computer network connections, peripheral connections for external devices, and power supply connections. This assembly also provides a seal to prevent infiltration of fire, water, and other environmental hazards into the protected environment. The connection assembly also can provide environmental data such as ambient temperature to the computer in the protected interior of the enclosure. This environment information may be used by software processes running on the computer components to activate additional, optional, passive and active protection mechanisms. Since power management is used to control and minimize heat generation, the heat generated is low enough that passive dissipation is sufficient and, being passive, is inherently more reliable than active dissipation techniques. We have found that passive heat dissipation (typically through two or more layers of material to the outside) is adequate if the internal temperature does not exceed operating parameters of the specific electronics that are used, for example, 30° C., i.e. 86° F. If there is insufficient passive heat dissipation, the wall thickness can be reduced or wall materials of greater heat conductivity are used.

In one preferred form of the invention, provision is made for the control of heat generated by the enclosed computer components. The invention successfully dissipates small amounts of heat from within the enclosures but also protects the inside of the enclosures from extreme heat to which it may be exposed on the outside. First the heat produced by the computer server inside the enclosure is reduced to a minimum. When this is done, we have found that a heat-absorbing substance or phase-change material such as a salt or other meltable substance which is used in the enclosure does not activate and the heat is successfully transferred through the enclosures to the outside environment. In the event of a fire, however, the enclosures protect the computer server from extreme temperatures due to activation of the phase-change material. Thus, low levels of internally produced heat are dissipated through phase-change material while high levels of heat are absorbed by phase-change material as it changes from a solid to the liquid phase. The protective enclosure provides time to prevent excessive internal temperatures during a brief period of typically ½ to one hour following a fire. The actual length of time depends of several factors including the nature and amount of phase change material used as well as the size of the enclosure and its characteristics. The enclosure still, however, permits the dissipation of internally generated heat to the outside environment by conduction through the walls and a layer of phase-change material. Thus, the invention protects against a brief period of heat exposure, but during normal operation adequately dissipates internally produced heat.

A digital data storage assembly that is provided as a part of the computer contains the digital data stored in the apparatus and is structured to tolerate some hardware failures so as to provide back-up storage of customer data in the event of a disaster. One preferred embodiment of this component is a RAID (Redundant Array of Independent Disks) data storage component.

A digital data storage processing element provides the processing required to manage the storage and retrieval of the digital data from the digital data storage assembly, handles encryption of the data for additional protection of the data, and performs the computer network protocol processing required to accept and provide digital data to other network-attached computers. This processing element also uses environmental information, provided by sensors, to protect the digital data by active means, such as powering down components of the apparatus. This processing element also provides notification of exceptional potentially harmful conditions to remote entities using communications connections, such as a wired computer network connection, telephone connection, or a wireless computer network connection.

The temperature sensors used in the invention are provided as embedded, integrated mechanisms common in many present day integrated circuits (ICs) and are part of what is referred to as "hardware health monitoring" to monitor such elements as voltage, temperature, fan RPM, etc. Monitoring can be accomplished, for example, using a suitable Intel inter IC Bus (I2C Bus) to prevent potentially harmful conditions between computer components, e.g a display or alarm. Alternatively, a Phillips System Management Bus (SMB) which is based on a I2C bus can be used. These embedded sensors and the information they provide, such as temperature, are used in accordance with the present invention to trigger an alarm or to cause the operating system (OS) to take evasive or protective action.

Also, in accordance with a preferred form of the invention, a data encryption module is provided which employs suitable known methods and devices for the optional encryption of data stored within the computer server. The preferred embodiment for this assembly is a data encryption algorithm which, along with a key, transforms clear text data into encrypted data prior to its being stored in any storage elements. Upon retrieval of encrypted data from storage elements, a reverse transformation decrypts the data back to the original clear text. The storage elements can be the main storage element assembly or, if desired, a flash memory device such as Secure Digital memory cards can be used. Encryption keys can be provided manually, as will be described in more detail below, by a biometric device or resident within a flash memory device such as a Secure Digital flash memory device. When a flash memory or biometric device is used, it is preferably located inside the protective enclosure, but may also be connected through the external connection assembly so as to be located outside the enclosures, depending upon security or operational requirements. The protective apparatus provided in accordance with the invention consists of a number of components serving distinct purposes to enhance survivability and promote effectiveness and usage of the the invention. The invention thus provides an improved method and apparatus to store and protect digital data such as financial records, digital photos, scanned images, documents, and other digital data. During use the digital storage system is contained and operates within a protective enclosure that is capable of surviving fire, shock, crushing forces, submersion, and other effects of a disaster. By keeping heat production within the enclosure to a minimum, the Digital Data Storage Assembly components are able to operate properly even though enclosed and sealed. The collection of information about the external environment allows additional active protection mechanisms to be used as will be described to further enhance the Digital Data Storage Assembly's survivability. The active protection mechanisms include activation of remote alarm systems using computer network connections and activation of power management techniques to reduce heat output or system shutdown.

DETAILED DESCRIPTION OF THE INVENTION

There are two complementary aspects to the invention; first, a mechanical aspect that concerns the hardware which is provided, and second, the method of operation which will be described following a description of the mechanical aspects.

The mechanical aspects of the invention will now be described by way of example with reference to FIGS. 1-6. Refer first to FIG. 1 which shows in perspective the external protective enclosure or housing such as a metal box 10 with a lid 12 shown open. The material from which box 10 is constructed provides an external protective enclosure 17b that is strong enough to survive crushing disasters and preferably has heat-absorbing qualities. A water-resistant or waterproof rubber or plastic seal 16 is provided for sealing out liquids, vapors, and other contaminants detrimental to an internal envelope assembly 27 and its contents. The internal envelope assembly 27 contains a heat-absorbing substance 17a such as a metal of high heat capacity, e.g. iron, or an enclosed salt or other meltable (phase-change) substance to absorb heat as it melts, e.g. at say about 90° F.-140° F. so as to increase the survivability of any internal components by reducing the rate gradient at which the internal temperature rises due to environmental conditions. Examples include myristyl alcohol M.P. 100° F., cetyl alcohol M.P. 120° F., and stearyl alcohol M.P. 137° F. The heat-absorbing phase-change substance 17a and 17b shown in the cut-away portions of the protective enclosure 10 and the internal envelope 27 or other heat transmissive material, e.g. a metal, acts as a conductive enclosure for transferring internal heat to the environment. Placed inside the internal envelope is a digital electronic data processor and memory such as network computer server within an enclosure assembly 15. A power and network connection cable 14 is fed through a liquid/contaminant-resistant passage 13 and extends from the computer server out through the external protective enclosure 10 to provide power, computer network connectivity, and connectivity for sensors external to the enclosure. The front side of the internal envelope 27 can be seen through the cutout in the center of the protective enclosure 10. A fluid level sensor 89 between the external protective enclosure and the internal envelope assembly detects flooding such as water. This information is transmitted to the computer server as detailed later. In addition, a battery backup and charger unit 100 is mounted somewhat above the internal floor of the external protective enclosure, and above the level at which the fluid level sensor activates signaling fluid contamination. Power from the external cable 14 is fed internally to the battery backup/charger unit 100 via power cable 101. This allows the computer server within the closure 15 to shut itself off in the event external power is suspended. The battery backup/charger system is shown in FIG. 7.

Figure 2:
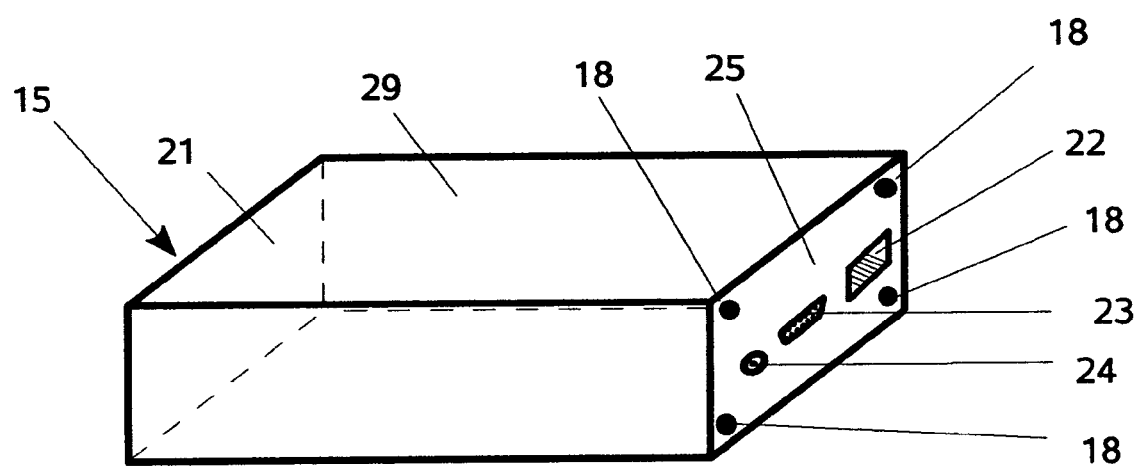
FIG. 2 is a perspective view of the computer server enclosure showing power, console and Ethernet connectors.

FIG. 2 is a perspective showing the network server electronics enclosure assembly 15 consisting of the network server electronics enclosure or housing 29, the rear cover 21, the front cover 25 and the front cover fasteners 18 which fasten the front cover 25 to the network server electronics enclosure 29. A suitable connector mechanism is employed to fasten the rear cover 21 to the network server electronics enclosure, e.g. as shown below in FIG. 3. To illustrate by way of example how the invention can be used, an RJ-45 Ethernet connector 22, an RS-232 diagnostics connector 23 and a 10 mm×2.1 mm DC power connector 24 can be seen through cutouts in the front cover 25.

Figure 3:
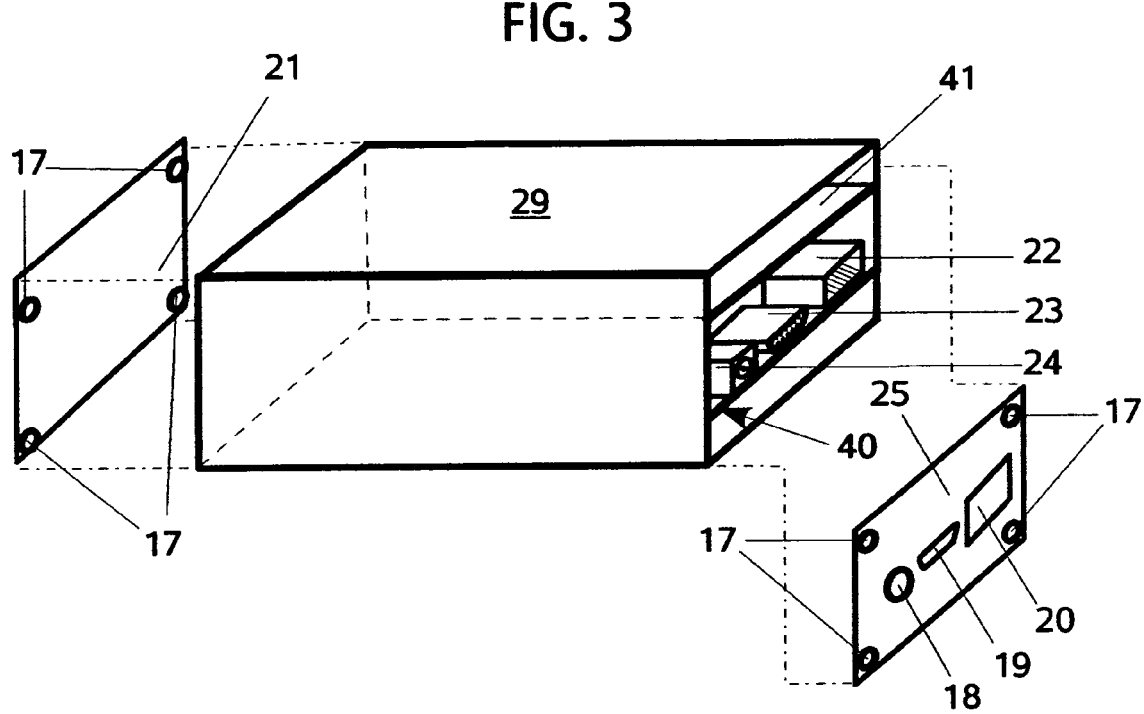
FIG. 3 is a perspective view of the computer server enclosure with its associated access panels removed to reveal the internal computer server printed circuit board (motherboard or MB) and a second board which acts as a carrier for storage elements or disk drives.

FIG. 3 is an exploded perspective of the network server electronics enclosure assembly 15 with a back cover 21 and a front cover 25, both of which have mounting holes 17 to receive fasteners, e.g. screws, to fasten the covers 21 and 25 to the enclosure 29. The front cover 25 typically has three cutouts. A power cutout 18 allows access to the power connector 24; a console cutout 19 allows access to the RS-232 diagnostics connector 23; and an Ethernet cutout 20 allows access to the RJ-45 Ethernet connector 22. Each of these connectors is mounted on the computer server motherboard 40. A storage device carrier board 41 is also shown.

Figure 4:
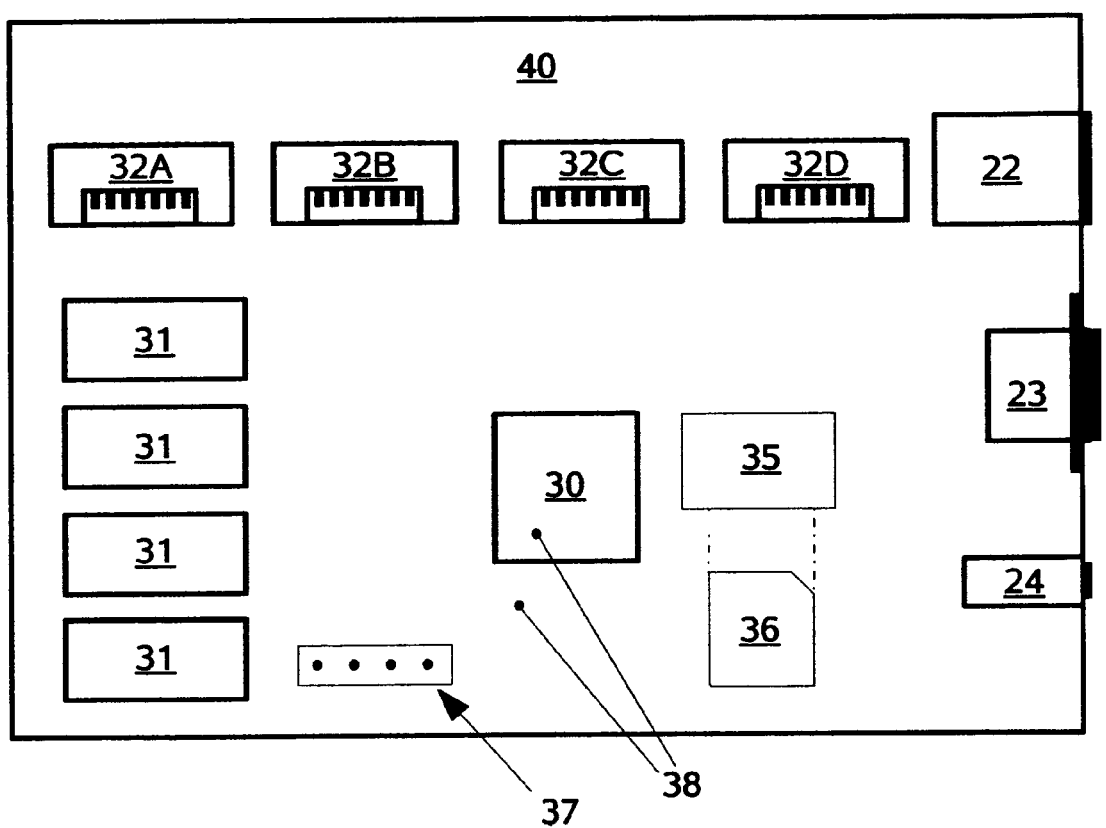
FIG. 4 is a top plan view of the computer server motherboard and the major components (CPU, memory, connectors) that are on the motherboard as well as four I/O interface ports and a connector for attaching a non-volatile storage element.
Figure 5:
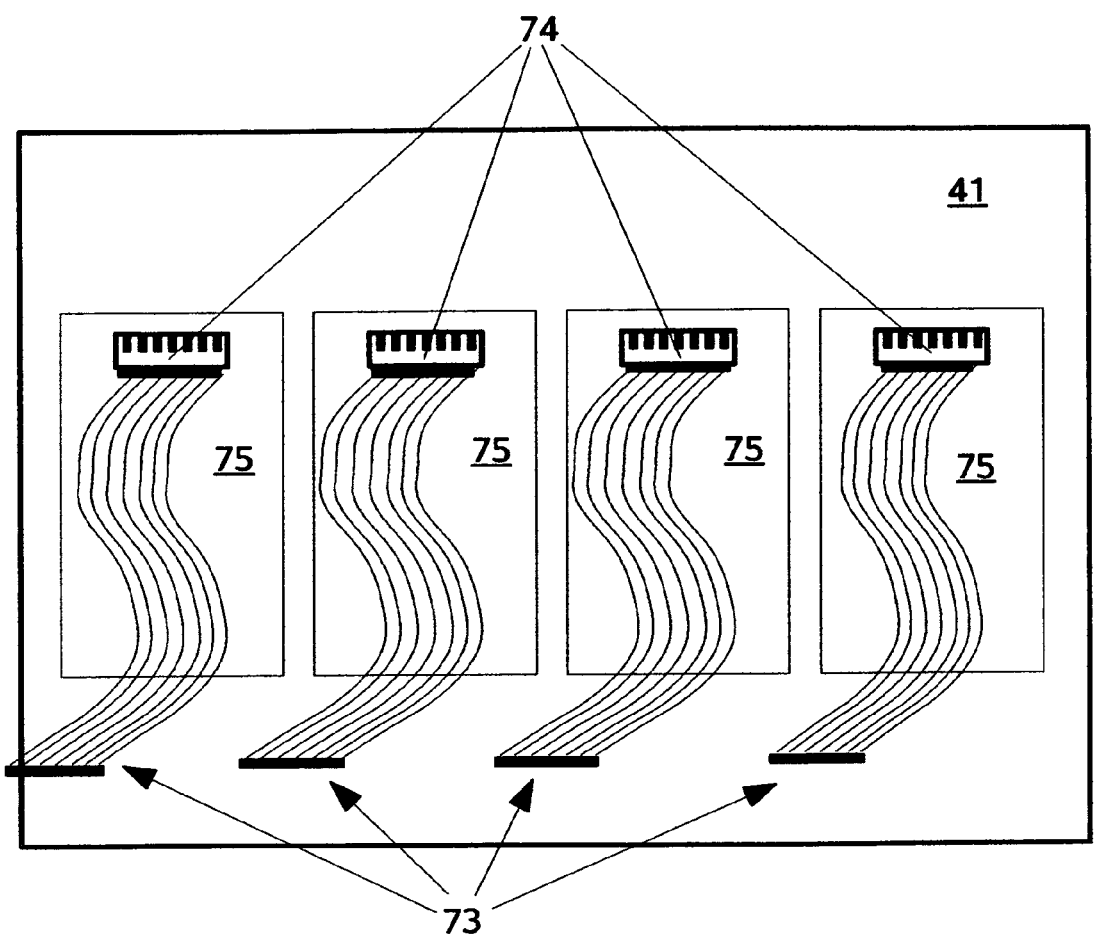
FIG. 5 is a bottom view of the storage element carrier board showing four storage elements with their connectors and cables.

FIG. 4 shows a top view of the motherboard 40 which, by way of example, is a fully self-contained, single-board computer with power 24, diagnostics 23, and Ethernet 22 connectors. Furthermore, there are main memory modules 31, a central processing unit or CPU 30, and four Consumer Electronics Advanced Technology Attachment (CE-ATA) ports (32A, 32B, 32C, 32D) which provide the motherboard I/O connectivity to storage elements 75 (FIG. 5). A bank of General Purpose I/O (GPIO) pins 37 is provided for connecting sensor signals that are external to the motherboard to the CPU and operating system. Examples include the flood and power good signals of FIG. 7. Temperature sensors 38 are present both embedded in the CPU chip to relate the temperature of the CPU itself as well as a motherboard residing sensor for ambient and/or motherboard temperature. These sensors communicate via the aforementioned I2C or SMBus. A flash device 36 such as, but not limited to, a Secure Digital (SD) flash memory device attached to the motherboard via SD connector 35 can provide additional storage space and/or an encryption key for security. Encryption is described in connection with 35 and 36 in FIG. 4 in order to provide data security from adversaries, the key being required in order to view unencrypted data. The operating system uses a key of 40 or more bits that acts in concert with an encryption module which employs an algorithm of well known construction, such as, but not limited to, Data Encryption Standard (DES), Triple DES (3DES), or Blowfish to encrypt and decrypt data stored in the storage elements as it is stored and retrieved. Without the key, access to decrypted data is mathematically extremely difficult. Common key sizes include 40 bits, 128 bits, 512 bits, 1024 bits and 2048 bits. 40-bit encryption provides a 1 in $10^{12}$ chance of guessing the key; 2048 bit encryption reduces that probability to less than 1 in 2.5× $10^{614}$. The key size and encryption algorithm chosen is dependent upon the performance needed and the level of security desired. As an alternative to a non-volatile device containing a key is that an individual or entity provides a key by entering it manually via the diagnostics port 23 or via the network connection 22. In either case, it is the responsibility of an individual to provide and retrieve the key, be it in a flash device or manual entry. The aforementioned external connector 24 can also be seen in FIG. 4.

FIG. 5 shows the bottom view of the storage element carrier board 41 revealing four 1.8" CE-ATA hard disk drive storage elements 75 anchored to the storage element carrier 41. Each storage element 75 has an integrated CE-ATA connector 74 to which a CE-ATA I/O cable is attached. The other, i.e., free ends 73 of the cables have similar CE-ATA connectors which are attached to one of the four CE-ATA ports (32A, 32B, 32C, 32D) on the motherboard 40 (FIG. 4).

Figure 6:
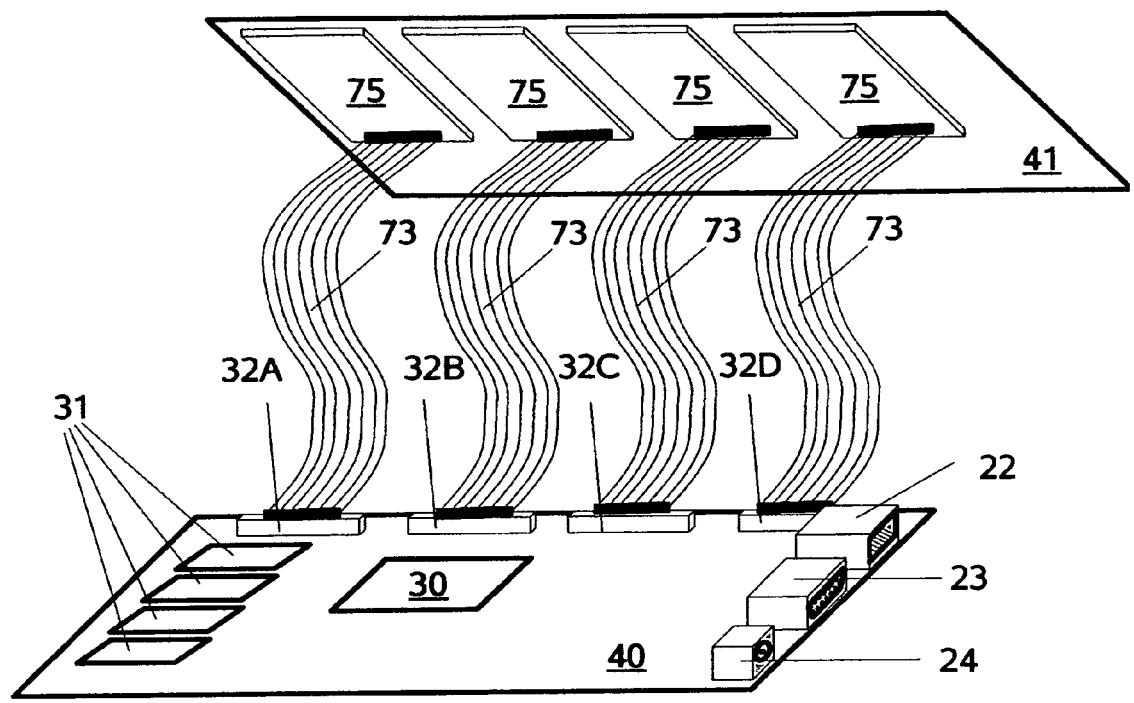
FIG. 6 is a partial exploded perspective view showing the cables connecting the storage elements to the motherboard.
Figure 7:
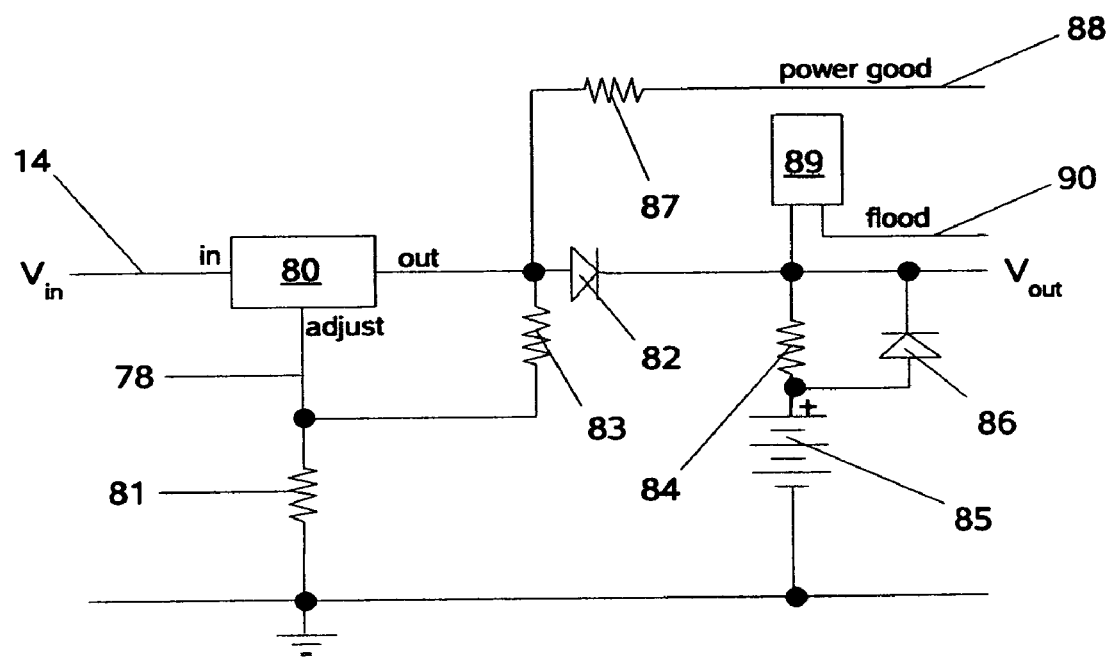
FIG. 7 is an electrical schematic showing a battery backup circuit with battery-charging capability.

FIG. 6 illustrates the cables 73 connecting the storage elements 75 to the motherboard providing I/O access and power to the storage elements 75. Once the cables are attached between the motherboard 40 and storage element carrier board 41 and the boards are brought together, the cables 73 are sandwiched between the two. The entire assembly is then inserted into the computer server enclosure 29 as depicted in FIG. 3.

FIG. 7 is a schematic for a battery backup and battery charger 100 (FIG. 1) circuit. Power from the power and network cable 14 (FIG. 1) is applied to $V_{in}$ typically providing a range of 5V to 32V of DC power to voltage regulator 80. $V_{out}$ is the main power for the computer server and is connected to power connector 24 (FIGS. 2, 3, 4). A resistor 81 is connected between voltage regulator 80 and ground by conductor 78, and a resistor 83 is connected between conductor 78 and regulator output labeled out. Resistors 81 and 83 control and restrict the out voltage of the voltage regulator 80 to a level suitable for $V_{out}$ as well as a trickle charge for a battery 85 that is connected in series with a resistor 84 between $V_{out}$ and ground. A diode 82 in conductor $V_{out}$ between resistors 83 and 84 prevents battery power from flowing into the voltage regulator 80 if power to $V_{in}$ is removed. When power is applied to $V_{in}$, the resistor 84 operates as a current limiter for a trickle charge current, as specified by the battery 85 specification, thus charging the battery 85 as well as providing power to $V_{out}$. If in the case of an accident or power failure such that power to $V_{in}$ is suspended, the battery 85 will supply power to $V_{out}$ through a diode 86 which also ensures that only current limited with resistor 84 is available for the trickle charge of battery 85. The presence or absence of main power is indicated by a power good signal 88 which has a current limiting resistor 87 wired between 80 and 82 so that the power good signal 88 is current-limited by resistor 87. The power good signal 88 is connected to a GPIO input on the server motherboard 40 which then is able to monitor power. The power good signal 88, the status of which can be displayed by a lamp or meter (not shown), remains high provided main power is present. If main power is interrupted, the power good signal 88 goes low and appropriate automatic or manual corrections can then be taken. Possible corrections or other actions are discussed herein in the description of operation section.

FIG. 7 (and FIG. 1) also shows a fluid level sensor 89, wired between $V_{out}$ and a flood signal wire 90 which extends outside the internal envelope 27 but is inside the external protective enclosure 10 and is connected to a GPIO on the motherboard 40 to provide a flood signal. During operation, if fluid enters the external protective enclosure 10, the sensor 89 indicates this by asserting the flood signal via conductor 90 whereupon appropriate response actions may be taken. Possible actions are discussed below in the description of operation.

Figure 8:
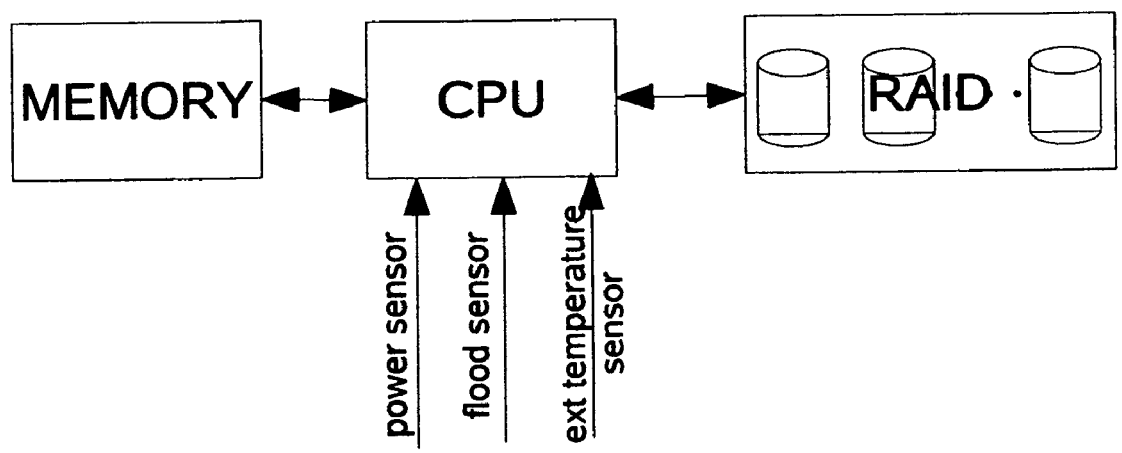
FIG. 8 is a block diagram showing the principal computer server hardware components.

The block diagram in FIG. 8 shows the primary elements of the invention. The CPU is the core of operations which runs an operating system. Memory stores data and instructions in the execution of the operating system as well as execution of the control loops in FIGS. 9a and 9b. The multiple storage elements shown in a RAID configuration is on the right while signals from external sensors is fed to the CPU/operating system via GPIO paths.

A few of the various alternatives to the preferred embodiment will now be described. The CE-ATA hard disk drives 75 are available in three different sizes, including the 1.8" size described in the preferred embodiment; 1.0" and 0.85" sizes are also available yielding more power savings but lower capacities. As capacities increase, these will become viable substitutes for the 1.8" size currently used. Furthermore, CE-ATA hard disk drives can also be replaced with some non-CE-ATA alternatives. First, Serial-ATA (Serial Advanced Technology Attachment) disk drives have the advantage of much greater storage capacity and higher performance but suffer from more power consumption and thus generate more unwanted heat. CE-ATA drives are aimed toward the consumer electronics (CE) market and thus have a different set of requirements including maximum power efficiency. However, the efficiency of Serial ATA (SATA) hard drives is increasing rapidly and thus could become a viable replacement for CE-ATA type drives with the advantage of higher capacity and performance. Second, storage elements can also be constructed of "flash memory" units of suitable commercially available construction. While these are very power efficient, they suffer from storage size limitations. Flash memory also suffers from limited read/write cycles. While the maximum number of cycles may be high, continuous writing to a specific area may render that area unwritable after the limit is reached thus rendering the entire device less usable in some cases. As an alternative to flash memory, a USB (Universal Serial Bus), Firewire (IEEE 1394), flash memory, or a hard disk drive can be used provided the motherboard is outfitted with an appropriate interface to which they may be connected. A fourth alternative is the use of IDE (Integrated Drive Electronics) hard disk drives which have been the norm for personal computers until the SATA standard was agreed upon and are being phased out of the industrial market. The latter can be used as the storage elements but they do not have hot-swap capability, use bulky and cumbersome 40 pin, flat ribbon cables and must have a discrete power connection. However, there are IDE type 1.8" hard drives which are available.

The operation of the apparatus will now be described. One major feature of the invention is the provision of power management techniques to maintain a level of heat production below that at which damaging effects occur. Excessive heat can result in a reduction in the level of effectiveness of the protective enclosure at one end of the spectrum to actual damage to the electronics at the other. While mechanisms for power reduction are well known and prolific, especially in the area of laptop/notebook computers, they are utilized to extend battery life, and due to overall laptop construction characteristics, do not function to prevent damage from heat build-up. In accordance with the present invention, heat build-up is sensed for activating processor down-scaling in which the speed of the processor is reduced, or disk drive power-down or shutdown when not needed, or alternatively "hibernation" in which the system state is stored in non-volatile storage and the power is cut. Upon returning to a normal temperature range, the computer system including boards 40 and 41 are reactivated and the original system operating state is restored.

Refer now to FIG. 4 which illustrates control mechanisms including hardware and operating system support components that include GPIO inputs 37 and temperature sensors 38 working in concert to effect power management, for example, Advanced Power Management (APM) or Advanced Configuration and Power Interface (ACPI). These components provide precise power management including, but not limited to processor down-scaling. Alternatively, the present invention provides power management such as disk drive power down as shown in FIG. 9b during times of inactivity or the replacement of disk drives with other, lower power, non-volatile storage such as flash memory. Thus, the present invention will, in an emergency, reduce power consumption and thus heat generation to levels below any threshold for the trigger of the aforementioned undesired effects of heat on the computer and/or any of its components (FIGS. 1-3, 9b).

One major power management method of the invention is minimization of the power consumption by storage elements. This can range from passive management via the use of very low power, non-volatile storage such as flash memory, as well as active power management by reducing power to disk drives, for example. The use of flash memory, while minimizing heat generation, suffers from the limitation of reduced storage space and is therefore not a preferred embodiment, typically in the range of 10's of gigabytes (GB). Hard disk drives provide storage in the 100's of GB but suffer from higher power consumption.

When utilizing hard disk drives (HDD), the operating system (OS) running on the processor continuously monitors environmental elements, especially temperature, via OS system calls to I2C and SMBus sensors. The electrical connections are all embedded in the ICs themselves, connected via GPIO, or mounted as discrete devices on the motherboard as shown at 37 and 38 in FIG. 4, and by 88, 89 and 90 in FIG. 7. While in operation but during periods of no activity, the OS preferably commands the HDD in accordance with the present invention into one of several states to reduce disk drive power consumption. Typically these states are: active/idle (normal operation), standby (low power mode, drive has spun down), or sleeping (lowest power mode, drive is completely shut down). At some future time when the activity resumes, the OS can command the drive to resume normal operation. In addition, the HDDs contain an embedded and integrated time-out switch controlled by the HDD internal circuitry. The OS controls the behavior of the HDD timeout switch by setting a timeout period in the HDD itself. The HDD will resume normal operations on its own whenever service is requested of it, thus reducing the amount of interaction required of the OS. This timeout period provided by the HDD is typically controlled by an 8-bit binary value providing for timeouts in the range of five seconds to twelve hours.

This 8-bit value is communicated to the HDD by the operating system via the use of the appropriate HDD device driver system call.

A further detailed explanation of the operation of the invention will now be provided. Refer now to FIG. 8 which shows a block diagram of the main computer elements of the invention described briefly above within the enclosure assembly 15 (FIGS. 1, 2), including the CPU, memory, hard disk drives, temperature sensors, network connectivity and backup power assembly. The CPU, memory, network connection, and hard disk drives which make up the computer server that the invention is used to protect is the assembly comprised of boards 40 and 41. Computer boards 40 and 41 carry out two vital operations. First, they operate the disk drives as one or more RAID arrays thus providing the data storage function. The computer also monitors environmental, mechanical and other events that may be unsafe to make possible taking preemptive measures.

Temperature sensors designated 38 (FIG. 4) and 39 (FIG. 1) are located both inside 38 the inner enclosure 15 and outside 39 the external enclosure 10 (FIGS. 1, 2). Sensor 38 is an internal sensor which allows the computer to sense a problem due to excessive heat and take protective action as described in the flowcharts of FIG. 9a and FIG. 9b such as by powering down to reduce power consumption until the temperature is lowered to a safe level. The external sensor 39 (FIG. 1), can detect external events such as the heat of a fire and power itself off to extend survivability. It is connected to an available GPIO via a signal wire which shares the cable passage 13 (FIG. 1). In the event that a disaster involved loss of power, the battery backup system 100 (FIG. 1) is added to also ensure the invention can power itself off to extend survivability.

Figure 9A:
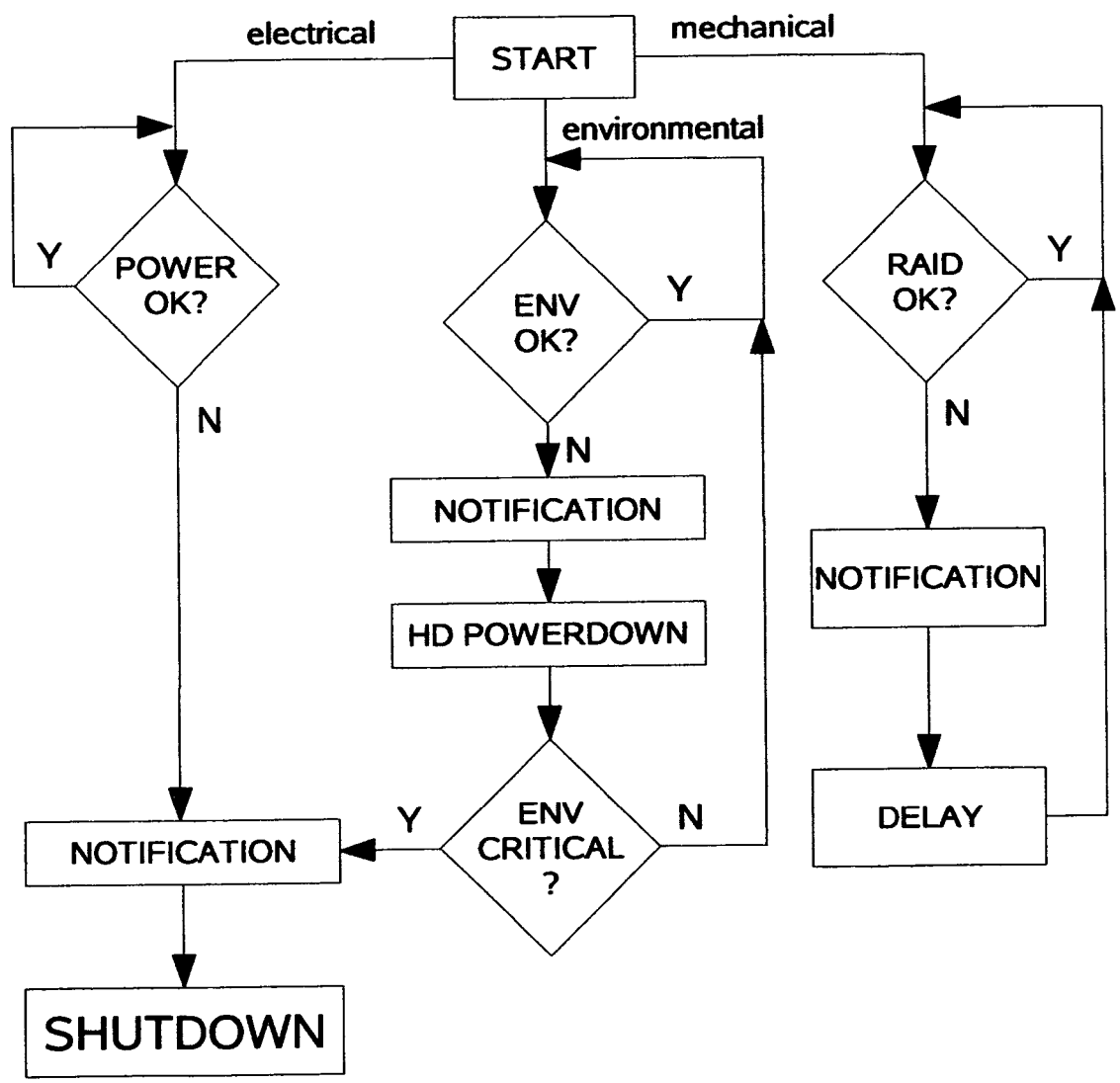
FIG. 9a is a flow diagram depicting a decision tree in accordance with the invention for survivability.
Figure 9B:
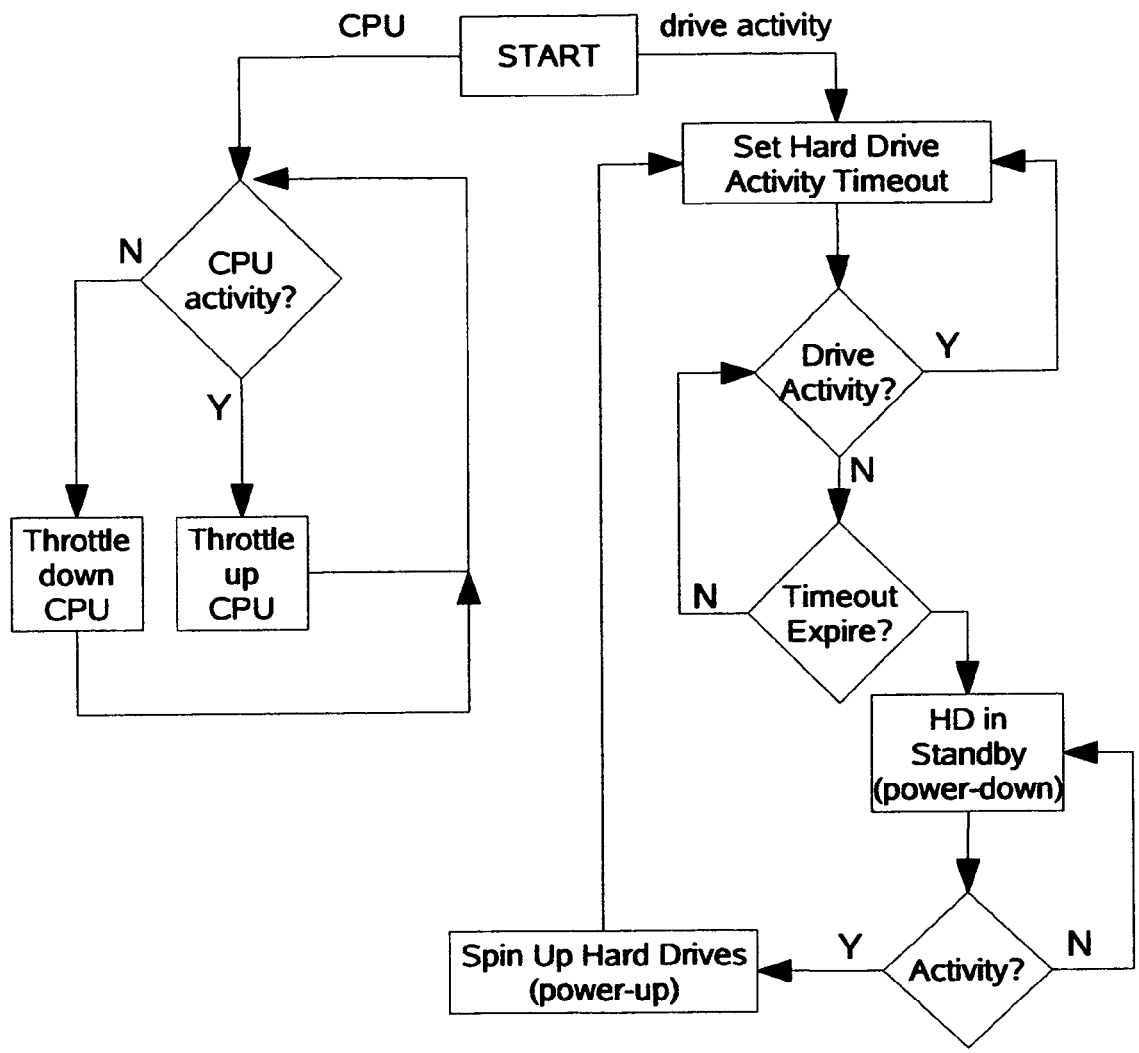
FIG. 9b is a flow diagram depicting the decision tree in accordance with the invention for power control.

FIG. 9a is a flowchart in accordance with the invention of the decision tree for the disaster survivability process. Three simultaneous loops are actively monitoring the possibility of electrical, environmental, and mechanical problems that may arise. In the case of an electrical problem; the power is monitored to ensure that it is OK. Electrical components can survive harsh environments much better when powered off than when operating. In the case of a disaster such as an explosion or fire, the main power may be interrupted at which time an optional battery backup system provides power to the computer enabling it time to perform specific selected tasks including a notification process such as the actuation of lights, warning buzzers, email, etc., before eventually shutting down the system and powering off. In the event the device powers off, manual intervention is used to restart the system.

The invention provides for monitoring of internal and external conditions, i.e. environmental conditions such as temperature via the second loop of FIG. 9a. If any temperature sensors 39 (FIG. 1) or 38 (FIG. 4) indicates a temperature outside a predetermined normal range, then the notification process described above is activated. If the temperature is beyond a critical threshold, the notification process and power-off mode which prevents damage to the components is activated. An optional humidity and/or water sensor 89 (FIGS. 2, 3, 7) is preferably included for sensing and reporting dangerous humidity conditions to the CPU.

The third loop monitors mechanical damage. If one of the storage elements of the RAID array fails, the notification process is activated and the failed element is identified. The identification of the failed element can be accomplished in any suitable manner as by current consumption monitoring or other known method. After a specified amount of time has passed, e.g. 1-5 minutes, the third loop again monitors and checks for storage element failure. Once a failed storage element has been replaced, normal monitoring continues. Since this server is rendered disaster resistant, it effectively provides continuous backups in real-time. Furthermore, the use of RAID for the storage element provides protection against individual storage element failure whether they be comprised of mechanical hard disk drives or solid state devices such as flash memory.

FIG. 9b is a flowchart in accordance with the invention of a decision tree that is provided for the management of power. Two simultaneous loops actively monitor the use of the CPU and the use of the disk drives. In the first loop on the left, via the use of APM and ACPI as aforementioned, the CPU is continuously monitored for usage. In times when it is not needed, or demand for processing is very light, the cycle time of the processor is increased. This slows the speed of the CPU thus requiring less power. Alternatively, during times of heavy processing requirements, the speed of the CPU is increased, possibly to its maximum depending on load.

The second decision loop on the right monitors disk drive activity. Through the use of an operating system call (command to the hard drive) the hard drive is given a timeout value such as two minutes off time. Most modern hard disk drives have this capability. The hard drive itself then uses this timeout value and counts down to zero, resetting to the initial count upon the occurrence of any read/write or control activity. If the value zero is reached after, say, two minutes, the timeout has "expired" and the drive enters into a power-down or standby mode. Upon the occurrence of any read/write or control command, the hard drive powers-up (wakes up) and the command is completed and the timeout count is reset.

The following working example further illustrates typical circuit and operational constants and components that can be used in accordance with one preferred form of the invention. Referring again to FIG. 1 and FIG. 2, the external enclosure 10 can be any suitable commercially available metal storage chest. The internal assembly 27 can include a suitable commercially available meltable salt or other phase-change compound which is placed within the walls of the external enclosure 10. The network server electronics enclosure assembly 15 is a Hammond Manufacturing extruded aluminum case P/N 1455N1601. The motherboard 40 is a PC-Engines WRAP.2C with 266 MHz AMD GEODE CPU, 64 MB SDRAM memory with one Ethernet port, two mini-PCI interfaces and one RS-232 console I/F. Power for the invention is provided by a Cincon Electronics P/N TR25050 5V/4A AC adapter 24. The IDE I/O modules 133A and 133B are GlobalAmericanInc P/N 1801030 mini-PCI IDE controller boards.

Figure 10:
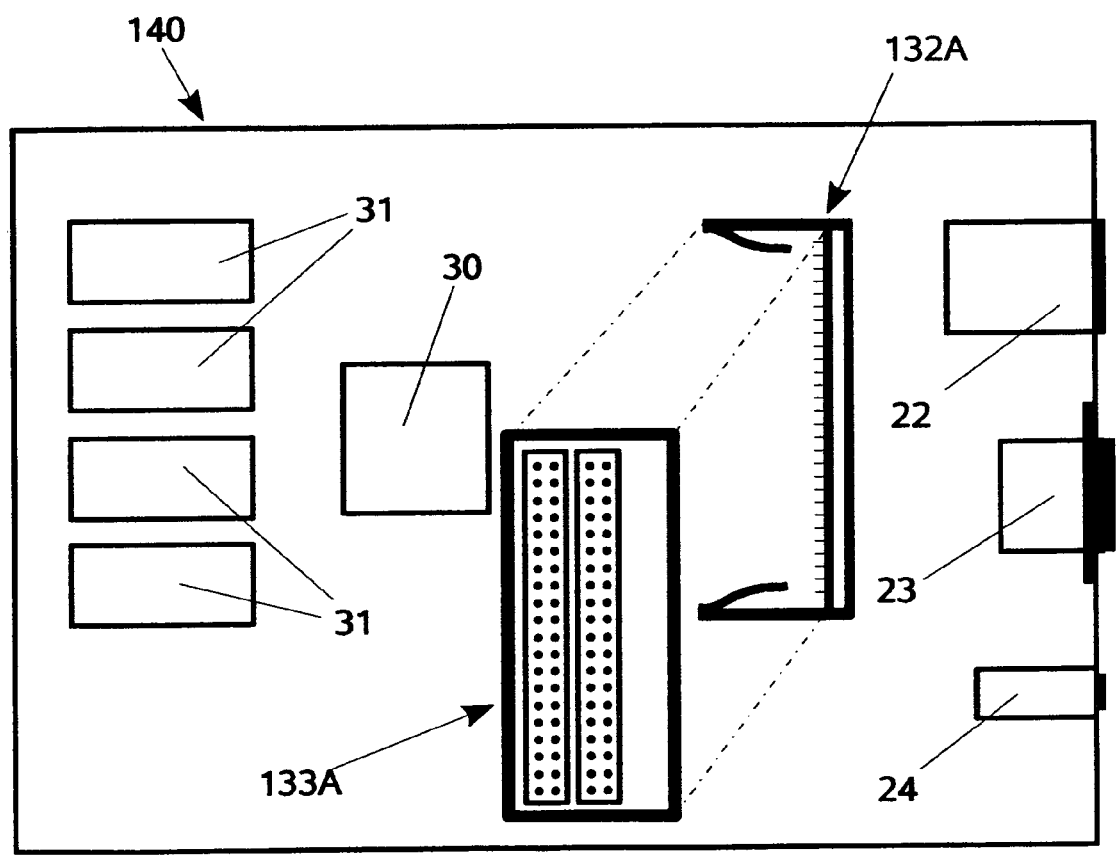
FIG. 10 is a diagram of the motherboard with associated mini-PCI, IDE (Integrated Drive Electronics) I/O controller used in the working example.
Figure 11:
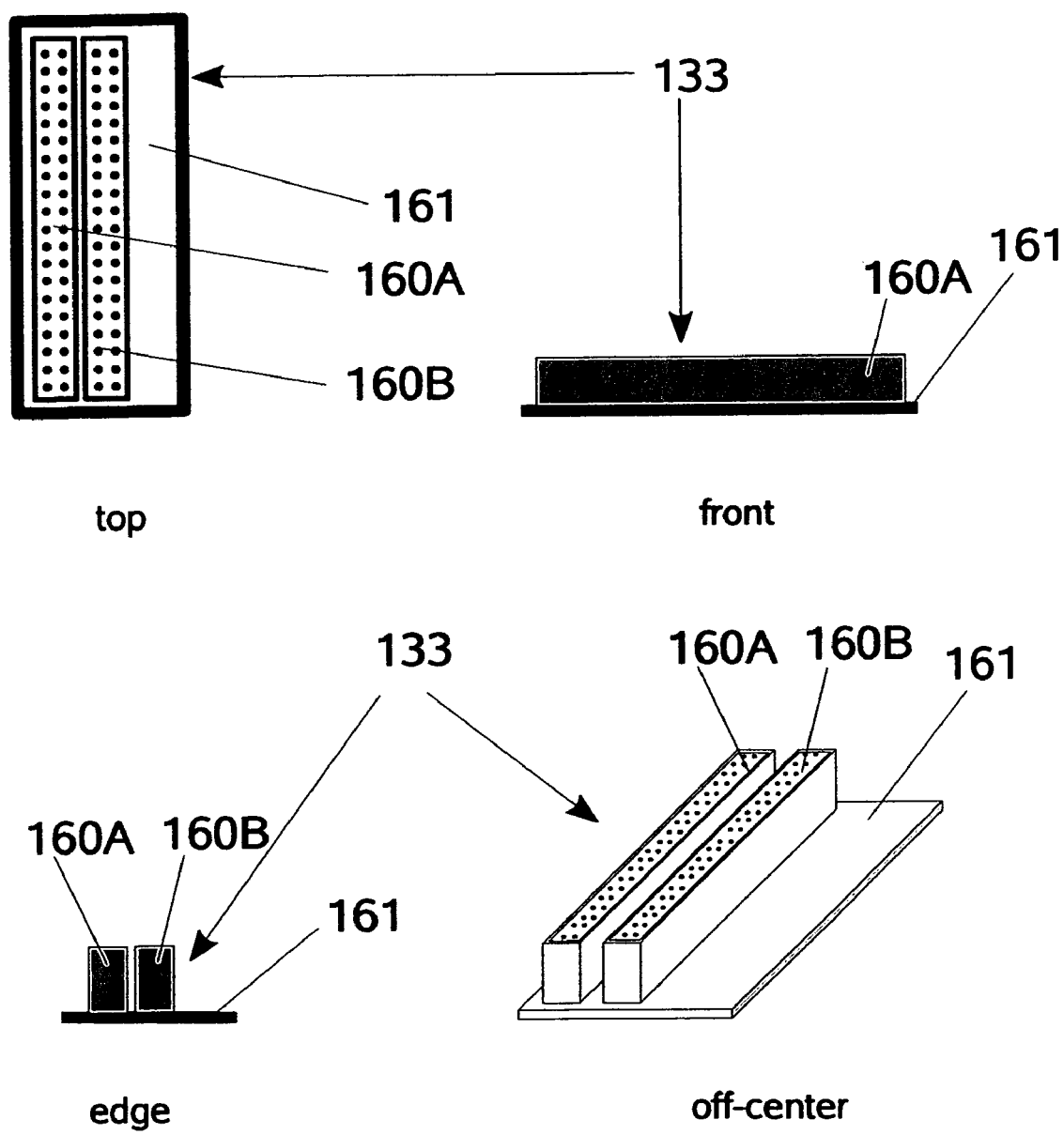
FIG. 11 shows perspectives of the mini-PCI IDE I/O controller used in the working example.
Figure 12:
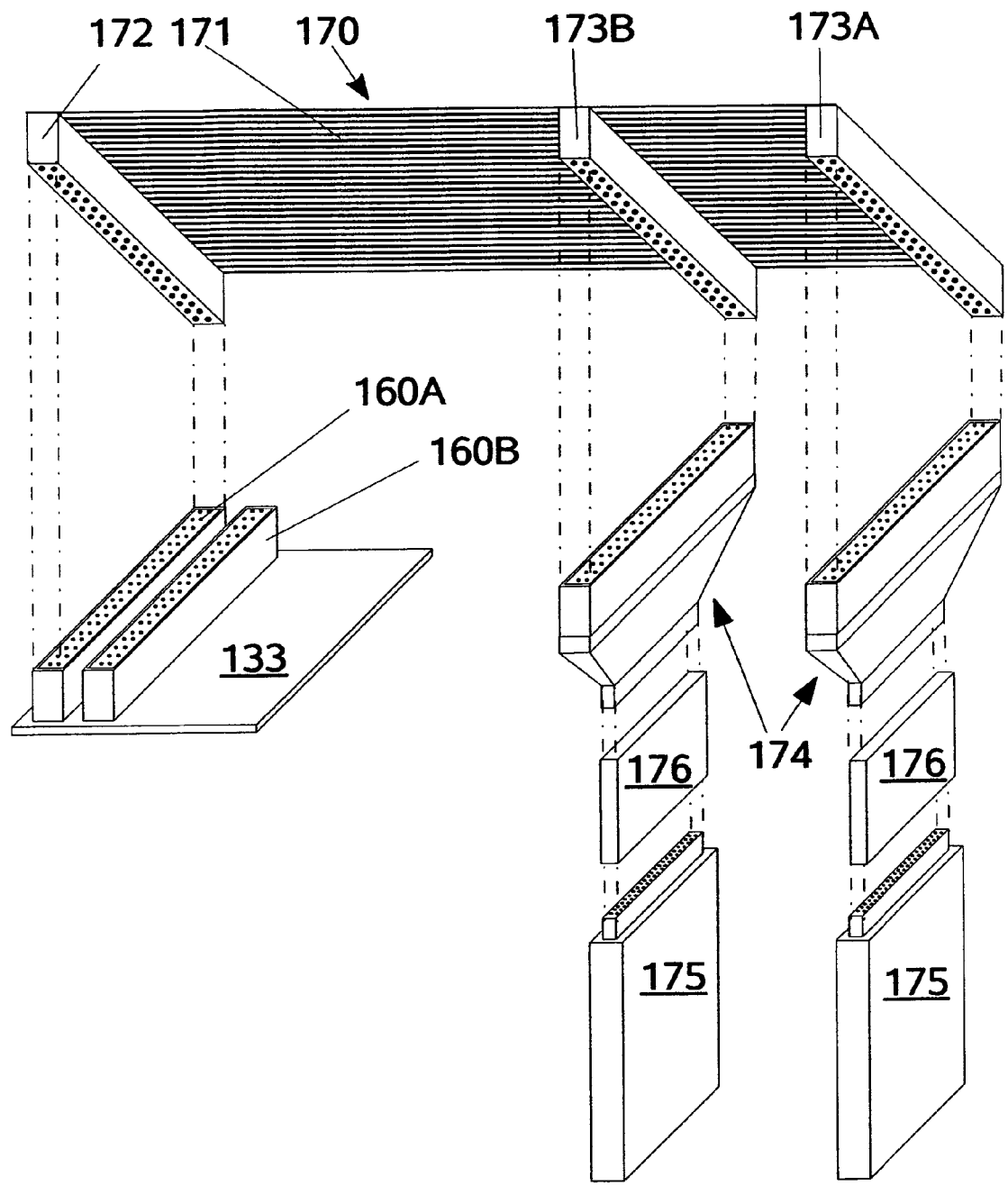
FIG. 12 shows the connections between the motherboard and storage elements via the use of the mini-PCI, IDE I/O controller and a standard IDE ribbon cable in the working example.

Refer now to FIG. 10 which shows the WRAP.2C computer server motherbbard 140 (with memory, CPU and external interfaces similar to motherboard 40) with a Mini-PCI interface 132A and a mini-PCI IDE controller 133A. The mini-PCI IDE controller 133A is inserted into the mini-PCI interface 132A. This provides two IDE ports to which an IDE ribbon cable can be attached. FIG. 11 shows top, front, edge, and off-center perspective views of a mini-PCI I/O module assembly 133. The top view shows the circuit board 161 which has two 40-pin IDE connectors 160A and 160B providing mechanical access to electrical I/O ports IDE0 and IDE1 respectively and which correspond to I/O ports 32a and 32b of FIG. 4. Referring to FIG. 12, the storage elements 175 which correspond to storage elements 75 of FIG. 5 are Toshiba MK5002MAL 5 GB 1.8" 4200 RPM UDMA/66 IDE disk drives. Converter 176 is an Addonics Technologies, 1.8" Toshiba drive to 2.5" laptop drive interface PIN AAT18IDE25. Converter 174 is a DataPro 2.5," 44-pin IDE to 40 pin IDE adapter P/N 1920-00C. Cable 170 is a generic 40-pin, 80-conductor IDE flat ribbon cable. FIG. 12 also illustrates the electrical connections necessary to allow the motherboard assembly 140 to utilize the storage elements (hard disk drive assemblies) 175. Each storage element 175 is connected to a 1.8" Toshiba hard drive interface to standard 44-pin laptop drive interface converter 176. This converter is then connected by a standard 44-pin IDE laptop drive to standard 40-pin IDE interface converter 174. In turn, the 40-pin side of each converter 174 is connected to one of the two 40-pin interfaces 173A and 173B of a standard 80-wire IDE ribbon cable 171 and assembly 170. The host interface connector 172 provides the mechanical interface to one of the two IDE connectors 160A and 160B (in this case 160A which is IDE0) on the I/O module 133 thus showing the specific connection of storage elements 175, via converters 174 and 176 and ribbon cable assembly 170 to IDE port IDE0. A second storage apparatus as just described in FIG. 12 (not shown) can be added by attaching it to the other IDE connector, either 160A or 160B, whichever was not used earlier (in this case 160B which is IDE1), thus bringing the total number of storage devices 175 to four.

Many variations of the present invention within the scope of the appended claims will be apparent to those skilled in the art once the principles described herein are understood.

What is claimed is:

1. An apparatus for protecting a digital electronic data processor or stored data from environmental damage, said apparatus comprising,
    a digital data unit including a network server and a data storage medium,
    a protective housing as an enclosure having strong side, top, and bottom walls resistant to both impact and crushing forces defining a closed compartment which contains the digital data unit for shielding the digital data therein from environmental contaminants including gas or dust that would otherwise cause environmental damage, and
    said housing including at least one access port for supplying electrical power or for information transfer to or from the data unit therein,
    a water-resistant or waterproof seal in said port to prevent the introduction of liquid environmental substances into the housing in the event of a potentially damaging external agency from an environmental disaster or other cause,
    an encryption assembly located inside the protective enclosure that comprises a data encryption module that encrypts data to be stored within and decrypts data retrieved from said data storage medium,
    the encryption module located within the protective enclosure is conductively connected through the waterproof or water-resistant seal,
    an internal environmental control assembly therein that is connected to the apparatus including a heat sensor contained within the protective housing and connected to the digital data unit and a power control for reducing or cutting off power to the digital data unit to provide controlled reduction of heat produced within a protected environment in the enclosure for maintaining the environment inside the housing within a selected temperature range
    such that said apparatus provides heat protection that includes a combination of a) active heat reduction provided by means of the power control and b) passive heat reduction by conductive heat transfer from the interior of the enclosure through a wall of the enclosure to the surrounding environment.

2. The apparatus of claim 1 including the internal environmental control assembly therein that is connected to the apparatus and the heat sensor connected to a data processing unit power control within the network server for reducing or cutting off power thereto to provide controlled reduction of heat produced within a protected environment in the enclosure for maintaining the environment at a selected temperature range and
    said environmental control assembly is operatively connected to the data processing unit such that the data processing unit within the network server controls the operation thereof.

3. The apparatus of claim 2 wherein the data processing unit is coupled to the environmental control assembly to activate or deactivate the control assembly and the protective housing has a seal to protect the data processing unit and the control assembly from infiltration of potentially damaging agencies that could otherwise result from the outside environment.

4. The apparatus of claim 1 wherein said apparatus provides heat protection including a combination of a) active heat reduction that includes a control connected thereto which diminishes power consumption by a data processing unit thereof to lower heat production thereof and b) provides passive heat reduction by conductive heat transfer from the interior of the enclosure to a phase-change substance comprising a meltable salt composition.

5. The apparatus of claim 1 including a meltable heat-absorbing substance as a part of said enclosure to absorb heat upon reaching a selected temperature for protecting said digital data means.

6. The apparatus of claim 1 wherein the encryption module is connected to an external data processor for transmitting encrypted data thereto to protect such data from theft.

7. The apparatus of claim 6 wherein the digital data unit is coupled to the environmental control assembly to activate or deactivate the control assembly and the protective housing is sealed to protect the digital data unit and the control assembly from infiltration of potentially damaging agencies that may be in the outside environment.

8. The apparatus of claim 1 wherein the encryption module includes a flash memory device acting as a physical key to permit encryption or decryption.

9. An apparatus for protecting a digital electronic data processor or stored data from environmental damage, said apparatus comprising,
    a digital data unit comprising data storage medium,
    a protective housing having strong side, top, and bottom walls resistant to both impact and crushing forces defining a closed compartment which contains the digital data unit including a network server, said housing shielding the digital data, the digital data unit and the network server therein from environmental contaminants including gas or dust that would otherwise cause environmental damage,
    said housing including at least one access port for supplying electrical power or for information transfer to or from the data unit therein,
    a water-resistant or waterproof seal in said access port to prevent the introduction of fluid environmental substances into the housing in the event of a potentially damaging external agency from an environmental disaster or other cause and including
    a processor control that has a temperature sensor which is in heat transfer relationship with the digital data unit within the protective housing that is connected so as to down-scale the speed of a central data processor and the digital data unit contained within the protective housing responsive to a build-up of heat sensed by the sensor to prevent damage from heat build-up.

10. The apparatus of claim 9 that includes heat protection which comprises a combination of a) active heat reduction comprising the processer control to diminish power consumption and the resultant production of heat thereby together with b) passive heat reduction by providing a heat transmissive means for conducting heat from the interior of the protective housing to a meltable phase-change substance for thereby reducing excessive heat build-up therein.

11. The electronic data protection apparatus of claim 9 wherein an encryption assembly located inside the protective enclosure comprises a data encryption module that encrypts data to be stored within said data storage medium of the network server and decrypts data retrieved from said data storage medium.

12. The apparatus of claim 11 wherein the encryption module located within the protective enclosure is conductively connected through a waterproof or water-resistant seal to an external connection assembly to transfer encrypted data from the enclosure to a remote data processor.

\* \* \* \* \*